United States Patent Office 3,386,963
Patented June 4, 1968

3,386,963
ISOCYANATE-TERMINATED POLYSULFIDE POLYMERS
Anthony F. Santaniello, Newtown, Pa., assignor to Thiokol Chemical Corporation, Bristol, Pa., a corporation of Delaware
No Drawing. Continuation-in-part of application Ser. No. 313,434, Oct. 3, 1963. This application Jan. 19, 1967, Ser. No. 610,233
8 Claims. (Cl. 260—77.5)

ABSTRACT OF THE DISCLOSURE

This is a disclosure of storage-stable isocyanate-terminated polysulfide polymers that are curable at room temperature by atmospheric moisture, with or without additional curing agents or catalysts, to elastomers having good properties for a variety of applications. The polymers are believed to have the structure $$OCN-[R-NH-\underset{\underset{O}{\|}}{C}-O-R'SS(R''SS)_nR'-O-\underset{\underset{O}{\|}}{C}-NH]_m-R-NCO$$

in which R is an alkylene or arylene radical, R' and R" are the same bivalent aliphatic radical wherein the carbon chain may contain oxygen atoms, $n$ is 1 to 100 and $m$ is 1 or more, preferably up to 15. The polymers can be made by reacting a polyisocyanate of the formula $$R(NCO)_x$$

in which $x$ is at least 2 with a polymer of the formula $$HO-R'SS(R''SS)_nR'-OH$$

at ratios of NCO:OH greater than 1.0, preferably up to 4.

---

This application is a continuation-in-part of pending application Ser. No. 313,434, filed Oct. 3, 1963, now abandoned.

This invention relates to polysulfide polymers, and more particularly to novel isocyanate-terminated polysulfide polymers prepared from hydroxyl-containing polysulfide polymers.

It is an object of the present invention to provide novel isocyanate-terminated polysulfide polymers. Another object of the invention is to provide stable, storable isocyanate-terminated polysulfide polymers. Still another object is to provide a method for preparing the novel polymers. A further object is to provide polymers which are curable at room temperature by atmospheric moisture, with or without the additional use of curing agents or catalysts, to elastomers having good properties and a variety of applications. Other objects of the invention will be in part pointed out and in part apparent hereinafter.

The polymers of the invention are presently believed to have the following general formula:

$$OCN-[R-NH-\underset{\underset{O}{\|}}{C}-O-R'SS(R''SS)_nR'-O-\underset{\underset{O}{\|}}{C}-NH]_m-R-NCO \quad [I]$$

wherein R is selected from alkylene and arylene radicals, R' and R" are the same bivalent aliphatic radical wherein the carbon chain may be interrupted by oxygen atoms, $n$ has an integral value of from 1 to 100, and $m$ has an integral value of 1 or more, and preferably from 1 to 15.

In a broad aspect, the polymers of the invention can be prepared by reacting hydroxyl-containing polysulfide polymers with polyisocyanates. The polysulfide polymers appear to have the structure $$HO-R'SS(R''SS)_nR'-OH \quad [II]$$

wherein R', R" and $n$ are as defined above and the polymers have a molecular weight of about 500 to 9000, preferably about 2000. The polyisocyanates have the structure $$R(NCO)_x$$

wherein R is selected from alkylene and arylene radicals and $x$ has an integral value of at least 2. The polysulfide polymer and the polyisocyanate are reacted in quantities such that the molar ratio of isocyanate groups to hydroxyl groups, NCO:OH, is greater than 1.0 and preferably in the range between 1 and 4. In cases where a readily curable prepolymer is desired, the molar ratio NCO:OH should desirably be greater than about 1.2, i.e., in the range between 1.2 to 4. Other reactants, such as formaldehyde, are preferably excluded from the reaction mixture.

The reaction conditions for the preparation of the polymers have not been found to be critical. At room temperature the reaction takes place rather slowly and, therefore, it is desirable to conduct the reaction at elevated temperatures, preferably in the range of about 50° to 150° C. Since the hydroxyl-containing polysulfide polymers used as starting materials are ordinarily liquids, no solvent need be used, although the usual inert organic solvents provide suitable reaction media. Pressure does not significantly affect the reaction, and thus, atmospheric, sub- and superatmospheric pressures can be applied to the reaction mixture. Of course, the effect of the interrelationship between the reaction temperature and pressure, determined by the volatility of the reactants, will be appreciated by persons skilled in the art. The reaction time varies, depending upon the nature of the reactants, from less than an hour to several hours.

The aliphatic radicals which form the backbone of the polysulfide polymers, represented by R' and R", encompass a wide variety of organic radicals. Some examples of such radicals, including radicals which have oxygen atoms or carbonyl groups in the hydrocarbon chain, are —(CH$_2$)$_y$— wherein $y$ has an integral value of from 1 to about 10, —CH(CH$_3$)CH$_2$—,
—CH(CH$_3$)CH(CH$_3$)—, —CH(C$_2$H$_5$)CH$_2$CH(C$_2$H$_5$)—
—CH$_2$CH(CH$_3$)CH$_2$—, —CH$_2$OCH$_2$—
—C$_2$H$_4$OC$_2$H$_4$—, —C$_2$H$_4$OC$_2$H$_4$OC$_2$H$_4$—
—CH$_2$OCH$_2$C(CH$_3$)$_2$CH$_2$OCH$_2$—
—C$_3$H$_6$OCH$_2$OC$_3$H$_6$—, —CH$_2$OCH$_2$C(O)CH$_2$—
—C$_2$H$_4$OC(O)OC$_2$H$_4$—, —CH(CH$_3$)OCH(CH$_3$)—
—CH(OCH$_3$)CH$_2$OC$_2$H$_4$OC$_2$H$_4$OCH$_2$CH(OCH$_3$)—
—CH(C$_3$H$_7$)OCH(C$_3$H$_7$)—, —C$_4$H$_8$OC$_4$H$_8$—
—CH$_2$C(O)$_3$H$_6$OC(O)CH$_2$—

—C$_2$H$_4$C(O)O(C$_2$H$_4$O)$_y$C(O)C$_2$H$_4$— wherein $y$ has an integral value from 1 to about 10, —CH$_2$CH=CHCH$_2$—, —CH$_2$CH=CHC$_2$H$_4$—, CH$_2$CH=CHC$_3$H$_6$—
—C$_2$H$_4$CH=CHC$_3$H$_6$—, —CH$_2$CH=CHCH(CH$_3$)— and —C$_2$H$_4$CH=CHCH$_2$CH(CH$_3$)—. In the commercially important polymers the total number of carbon and oxygen atoms in the radicals between the disulfide groups normally ranges from 2 to 10.

The hydroxyl-containing polysulfide polymers used to prepare the isocyanate-terminated polymers of the invention can be prepared by a one-step process wherein a dihalo-organic compound such as Cl—R"—Cl, a chlorhydrin such as Cl—R'—OH, and an inorganic polysulfide are reacted. Examples of the groups represented by R' and R" have previously been described. Chlorine is the preferred halogen group and sodium disulfide is the preferred inorganic polysulfide. Accordingly, the reaction may be illustrated by the following equation:

$$n\text{ClR''Cl} + (n+1)\text{Na}_2\text{S}_2 + 2\text{ClR'OH} \rightarrow$$
$$\text{HO—R'SS(R''SS)}_n\text{R'—OH} + 2(n+1)\text{NaCl} \quad [III]$$

Particularly suitable hydroxyl-containing polymers are those in which R' and R" are polymethylene radicals, such as —(CH$_2$)$_y$— wherein $y$ has an integral value of 1 to 10, and polymethylene mono- and polyether radicals such as  —C₂H₄—O—C₂H₄— and $$-C_2H_4-O-C_2H_4-O-C_2H_4-$$

The integral value of $n$, from 1 to 100, is such that the hydroxyl-containing polymer has a molecular weight of about 500 to 9000. Moreover, crosslinking agents such as 1,2,3-trichloropropane can be used to impart a limited degree of crosslinking, in the order of up to about 2% as desired, to improve particular properties of the ultimate isocyanate-terminated prepolymer. The two-step preparation of these polymers is described in U.S. Patent No. 2,789,958 to Fettes and Gannon.

Another way to prepare the hydroxyl-containing polysulfide polymers is to heat the corresponding mercaptan-terminated polysulfide polymers with a strong non-oxidizing acid, such as $H_2SO_4$, $HCl$ and $H_3PO_4$, and then nearly to neutralize the reaction mixture with a strong base.

A wide variety of polyisocyanates can suitably be reacted with the above-described hydroxyl-containing polymers to prepare the isocyanate-terminated polysulfide polymers of the invention. Generally, any of the organic polyisocyanates that have previously been proposed for the preparation of polyurethane resins may be employed in preparing the present products. Suitable polyisocyanates are, for example, arylene polyisocyanates such as tolylene, metaphenylene, 4-chlorophenylene-1,3-, methylene-bis-(phenylene-4-), biphenylene-4,4′-, 3,3′-dimethoxy-biphenylene-4,4′-, 3,3′-diphenyl-biphenylene-4,4′-, naphthalene-1,5- and tetrahydronaphthalene-1,5-diisocyanates and triphenylmethane triisocyanate; alkylene polyisocyanates such as ethylene, ethylidene, propylene-1,2-, butylene-1,4-, butylene-1,3-, hexylene-1,6-, decamethylene-1,10-, cyclohexylene-1,2-, cyclohexylene-1,4- and methylene-bis-(cyclohexyl-4,4′-)-diisocyanates. Toluene diisocyanates, commercially the most widely used diisocyanates, are preferred, especially a mixture of 80% of the 2,4-isomer and 20% of the 2,6-isomer thereof. Inorganic polyisocyanates are also suitable according to the invention.

As pointed out above, readily curable, so-called prepolymers, can be made according to the invention by using NCO:OH ratios above about 1.2. A variety of catalysts can be used to promote the cure of such polymers. Effective catalysts include hydrous metal halides such as ferric chloride and deliquescent salts such as potassium orthophosphate and potassium formate. The catalysts may be used alone or in combination in amounts up to about 1% by weight, preferably about 0.1% to 0.5%, based on the weight of the polysulfide polymer. In some cases an acceptable cure can be achieved with atmospheric moisture alone.

The curing time of the curable polymers varies from several hours to several days, depending largely on the molecular weight of the prepolymer, the humidity of the surrounding atmosphere, the type of application, e.g., as a coating film or as a structural mass, and whether a curing agent or catalyst is used.

The polymers of the invention have a variety of useful applications. Because of their tendency to adhere to glass, wood, metal and concrete, they can be used as sealants and adhesives. Certain of the polymers form tough elastomers, and therefore are suitable as protective coatings and structural masses. It has also been found that the curable polymers are suited to being cast and cured in molds to form virtually a limitless variety of articles.

The following examples are set forth to illustrate and to point out more fully the nature of the present invention, and are not intended to limit in any way the scope of the invention. The amounts of materials are expressed as parts by weight unless otherwise indicated.

EXAMPLE 1

A reaction vessel was charged with 161.2 gms. (.925 mol) of an 80/20 mixture, respectively, of the 2,4- and 2,6-isomers of toluene diisocyanate. To the vessel were added 430 gms. (0.421 mol) of a hydroxyl-containing polysulfide polymer having essentially the structure

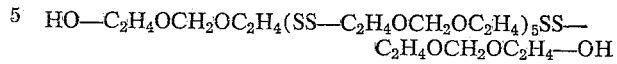
HO—C₂H₄OCH₂OC₂H₄(SS—C₂H₄OCH₂OC₂H₄)₅SS—
C₂H₄OCH₂OC₂H₄—OH over a period of about ten minutes. The reaction mixture was heated to about 100° C. in fifteen minutes, maintained at 100–120° C. for about fifty minutes, and then cooled to 60° C. and stored in a glass jar. The isocyanate-terminated polymer thus prepared had an —NCO content of about 6.9% as shown by infrared analysis, and was formulated as shown in the following table into compositions from which castings were made.

TABLE 1

| Formulation | A | B | C | D | E |
|---|---|---|---|---|---|
| Polymer (gms.) | 64.10 | 63.18 | 61.95 | 64.10 | 64.10 |
| Triisopropanolamine (gms.) | 6.375 | 6.738 | 4.403 | 3.188 | 0.3188 |
| Polypropylene glycol 425 (gms.) | | | | 2.1256 | 4.038 |
| Tack-Free Time at 120°±2° C. (mins.) | 10 | 10 | 8 | 50 | 90 |
| Total Cure Time at 120° C. (mins.) | 130 | 130 | 128 | 170 | 210 |
| PHYSICAL PROPERTIES AFTER AN 11 DAY AGING PERIOD | | | | | |
| Tensile Strength (p.s.i.) | 762 | 854 | 753 | -------- | 648 |
| Elongation (percent) | 92.5 | 80 | 80 | -------- | 77.5 |
| Shore "A" Hardness | 83 | 82 | 84 | -------- | 62 |

EXAMPLE 2

A reaction vessel containing 60.95 gms. (0.35 mol) of the toluene diisocyanate mixture described in Example 1 was charged with 261.6 gms. (0.1 mol) of a hydroxyl-containing polysulfide polymer having essentially the structure

HO—C₂H₄OC₂H₄—(SS—C₂H₄OC₂H₄)₁₇SS—
C₂H₄OC₂H₄—OH over a seventeen minute period. The reaction mixture was heated to 80° C. over a twenty minute period, maintained at 80°±3° C. for two hours and then allowed to cool to room temperature. The isocyanate-terminated polymer thus prepared contained about 8.3% —NCO as shown by hydrochloric acid titration. Castings were made from the formulations of the polymer shown in Table 2.

TABLE 2

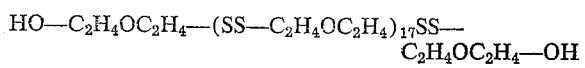

| Formulation | A | B | C | D | E |
|---|---|---|---|---|---|
| Polymer (gms.) | 34.8 | 34.8 | 34.8 | 34.8 | 34.8 |
| Triisopropanolamine (gms.) | 3.48 | | | | |
| Hexanetriol (gms.) | | 2.68 | | | |
| Triethanolamine (gms.) | | | 2.98 | | |
| Phenyldiethanol amine (gms.) | | | | 5.34 | |
| Polysulfide Polymer of Examples 2–4 (gms.) | | | | | 39.24 |
| Tack-Free Time at about 120° C. (mins.) | 115 | (*) | 103 | 100 | 90 |
| Total Cure Time at about 120° C. (mins.) | 235 | 232 | 223 | 220 | 210 |

*Surface cure.

EXAMPLE 3

A polymer prepared as described in Example 2, but using 52.25 gms. (0.30 mol) of toluene diisocyanate and a fifteen minute addition period, contained 7.41% —NCO. Castings were made from the four formulations of the polymer shown in Table 3. The castings had a green color and contained bubbles.

TABLE 3

| Formulation | A | B | C | D |
|---|---|---|---|---|
| Polymer (gms.) | 39.12 | 39.12 | 39.12 | 39.12 |
| Triisopropanolamine (gms.) | 3.84 | | | |
| Hexanetriol (gms.) | | 2.68 | | |
| Triethanolamine (gms.) | | | 2.98 | |
| Polysulfide Polymer of Examples 2–4 (gms.) | | | | 39.24 |
| Tack-Free Time at about 120° C. (mins.) | 38 | (*) | 95 | 87 |
| Total Cure Time at about 120° C. (mins.) | 158 | 372 | 215 | 207 |

*Surface cure.

EXAMPLE 4

A polymer was prepared as described in Example 2, but using 43.5 gms. (0.25 mol) of toluene diisocyanate and an addition period of ten minutes. The polymer, which contained 5.52% of —NCO, was formulated as shown in Table 4 and the formulations were made into castings which had a green color and contained bubbles.

TABLE 4

| Formulation | A | B | C | D |
|---|---|---|---|---|
| Polymer (gms.) | 52.51 | 52.51 | 52.51 | 52.51 |
| Triisopropanolamine (gms.) | 3.84 | | | |
| Hexanetriol (gms.) | | 2.68 | | |
| Triethanolamine (gms.) | | | 2.98 | |
| Polysulfide Polymer of Examples 2-4 (gms.) | | | | 39.24 |
| Tack-Free Time at about 120° C. (mins.) | 70 | (*) | 50 | 60 |
| Total Cure Time at about 120° C. (mins.) | 190 | 360 | 170 | 180 |

*Surface cure.

EXAMPLE 5

To a five liter one-neck round-bottom flask are added 3,000 gms. of a mercaptan-terminated polysulfide polymer of the formula

HS—C$_2$H$_4$OCH$_2$OC$_2$H$_4$—(SS—C$_2$H$_4$OCH$_2$OC$_2$H$_4$)$_6$—SH 1500 mls. of m-xylene and 4.5 gms. of p-toluene sulfonic acid dissolved in 10 mls. of water. A condenser is inserted into the neck and the mixture is heated at reflux for 24 hours. Silver nitrate titration is used to determine the absence of thiol groups, and thereafter the catalyst is neutralized with CaO. The xylene is removed under vacuum in a Roto-drier in which the water is also removed as part of an azeotrope. An essentially quantitative yield of the corresponding hydroxyl-terminated polysulfide polymer is obtained.

One hundred parts (0.086 mol) of the polymer thus prepared and 10 parts of benzene are added to a flask wherein the mixture is slowly agitated. The flask is swept with dry nitrogen and a dry nitrogen atmosphere is maintained throughout the remainder of the process. The mixture is heated to its boiling point at about 70° C., and benzene and water are removed by slow azeotropic distillation. After removal of all the benzene and water, the mixture is cooled to about room temperature and about 22.5 parts (0.129 mol) of an 80/20 mixture of 2,4- and 2,6-toluene diisocyanate, respectively, are added to the flask. Under constant agitation, the mixture is heated to 80° C. and held at that temperature for three hours. The mixture is then cooled to about room temperature and stored in glass jars under a nitrogen atmosphere. An isocyanate-terminated polymer is thus prepared from reactants having an NCO/OH ratio of 1.50.

It is of course to be understood that the specific embodiments of the invention shown in the foregoing examples are intended to be illustrative only and that numerous changes can be made in the ingredients, proportions and conditions set forth therein without departing from the scope of the invention as defined in the appended claims.

I claim:
1. An isocyanate-terminated polysulfide polymer of the structure

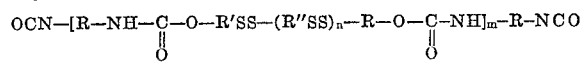

wherein R is a member selected from the group consisting of arylene and alkylene radicals, R' and R" are the same aliphatic radical wherein the carbon chain may be interrupted by oxygen atoms, n has an integral value of from 1 to 100, and m has an integral value of from 1 to about 15.

2. An isocyanate-terminated polysulfide polymer having the structure

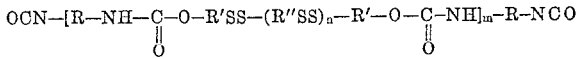

wherein R is a tolyl radical, R' and R" are the same member selected from the group consisting of —C$_2$H$_4$—, —C$_2$H$_4$OC$_2$H$_4$— and —C$_2$H$_4$OCH$_2$OC$_2$H$_4$— radicals, n has an integral value of from 1 to 100, and m has an integral value of from 1 to about 15.

3. A polymer according to claim 2 and wherein R' and R" are the radical —C$_2$H$_4$OC$_2$H$_4$—.

4. A polymer according to claim 2 and wherein R' and R" are the radical —C$_2$H$_4$OCH$_2$OC$_2$H$_4$—.

5. An isocyanate-terminated polysulfide polymer of the structure

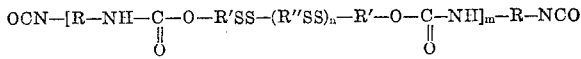

wherein R is an arylene or an alkylene radical, R' and R" are the same aliphatic hydrocarbon or aliphatic ether radical having up to 26 carbon atoms and up to 11 etheric oxygen atoms in the chain thereof and being carbon terminated, n has an integral value of from 1 to 100, and m has an integral value of from 1 to about 15.

6. An isocyanate-terminated polysulfide polymer having the structure

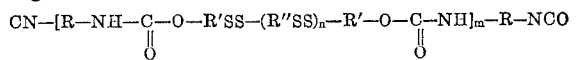

wherein R is a tolylene, metaphenylene, chlorophenylene, methylene-bis-phenylene, biphenylene, dimethoxybiphenylene, diphenyl-biphenylene, naphthalene, tetrahydronaphthalene, methyl-tris phenylene, ethylene, ethylidene, propylene, butylene, hexylene, cyclohexylene, decamethylene or methylene-bis-cyclohexylene radical, R' and R" are the same hydrocarbon or aliphatic ether radical having up to 26 carbon atoms and up to 11 etheric oxygen atoms in the chain thereof and being carbon terminated, n has an integral value of from 1 to 100, and m has an integral value of from 1 to about 15.

7. A polymer according to claim 6 wherein R is tolylene and R' and R" are the radical —C$_2$H$_4$OC$_2$H$_4$—.

8. A polymer according to claim 6 wherein R is tolylene and R' and R" are the radical —C$_2$H$_4$OCH$_2$OC$_2$H$_4$—.

References Cited

UNITED STATES PATENTS

| 2,789,958 | 4/1957 | Fettes et al. | 260—79.1 |
| 2,929,794 | 3/1960 | Simon et al. | 260—77.5 |
| 3,169,119 | 2/1965 | Dankert et al. | 260—77.5 |

FOREIGN PATENTS

| 1,285,748 | 1/1962 | France. |

DONALD S. CZAJA, *Primary Examiner.*

M. I. MARQUIS, *Assistant Examiner.*

UNITED STATES PATENT OFFICE
CERTIFICATE OF CORRECTION

Patent No. 3,386,963                                          June 4, 1968

Anthony F. Santaniello

It is certified that error appears in the above identified patent and that said Letters Patent are hereby corrected as shown below:

Column 2, line 46, "$-CH_2C(O)_3H_6OC(O)CH_2-$" should read -- $-CH_2C(O)OC_3H_6OC(O)CH_2-$ --. Column 5, line 58, "$OCN-[R-NH-\underset{O}{\overset{\|}{C}}-O-R'SS-(R''SS)_n-R-O-\underset{O}{\overset{\|}{C}}-NH]_m-R-NCO$" should read -- $OCN-[R-NH-\underset{O}{\overset{\|}{C}}-O-R'SS-(R''SS)_n-R'-O-\underset{O}{\overset{\|}{C}}-NH]_m-R-NCO$ --. Column 6, line 32, "$CN-[R-NH-\underset{O}{\overset{\|}{C}}-O-R'SS-(R''SS)_n-R'-O-\underset{O}{\overset{\|}{C}}-NH]_m-R-NCO$" should read -- $OCN-[R-NH-\underset{O}{\overset{\|}{C}}-O-R'SS-(R''SS)_n-R'-O-\underset{O}{\overset{\|}{C}}-NH]_m-R-NCO$ --.

Signed and sealed this 9th day of December 1969.

(SEAL)
Attest:

EDWARD M. FLETCHER, JR.                          WILLIAM E. SCHUYLER, JR.
Attesting Officer                                      Commissioner of Patents